July 10, 1928.
F. E. KRUSE
CARNATION PLANT HOLDER
Filed June 30, 1923
1,676,337
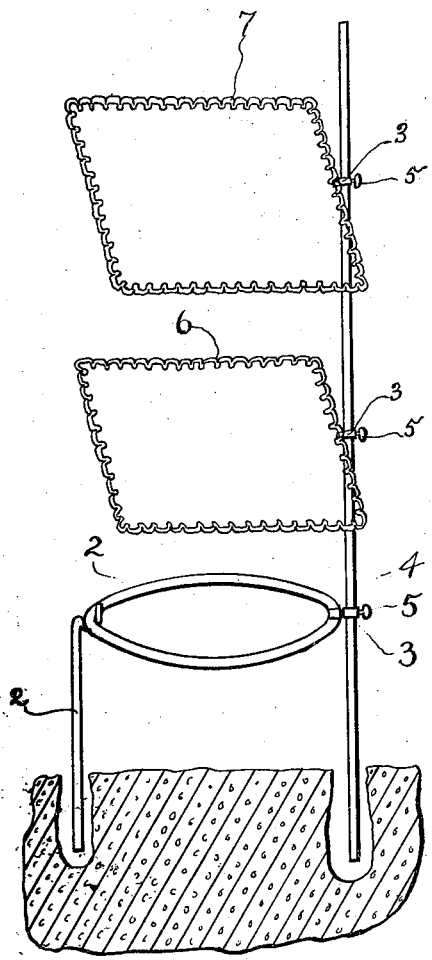
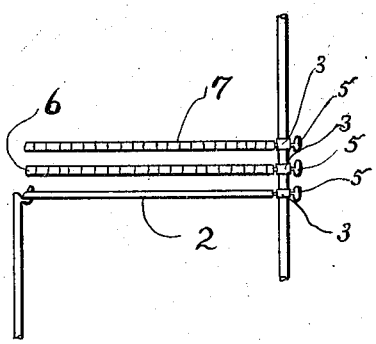
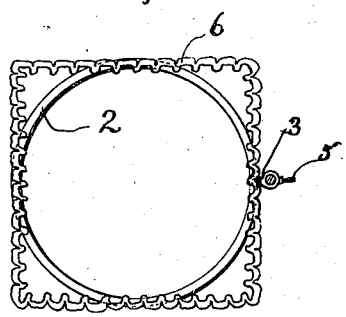
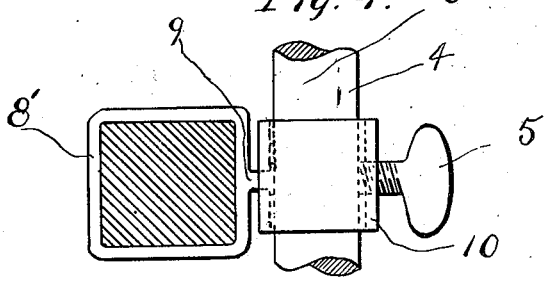
INVENTOR
Frederick E. Kruse
BY
F. W. Gilbert
ATTORNEY Patented July 10, 1928.

1,676,337

UNITED STATES PATENT OFFICE.

FREDERICH E. KRUSE, OF BINGHAMTON, NEW YORK.

CARNATION-PLANT HOLDER.

Application filed June 30, 1923. Serial No. 648,768.

My invention relates to improvements in carnation plant supports, and it has for its object to provide a cheap, simple, efficient and durable plant support, which is inexpensive and which can be readily placed in position about the plant so as to support it in all its stages of growth, and adjustable to its progressive and growing stages, and to provide such a device whereby the parts can be easily stored or shipped in compact form.

With these objects in view my invention consists in certain novel features of construction and arrangement of parts as will be hereinafter more fully described and pointed out in the claims, reference being had to the accompanying drawings in which:

Fig. 1 is a perspective view of my device, set in the ground;

Fig. 2 is a side view of my device in a collapsed or compact form;

Fig. 3 is a plan view of my device; and

Fig. 4 is a perspective view of a fragmentary part of a modified form of my device.

The same reference characters denote like parts in each of the several figures of the drawing.

In carrying out my invention, I provide a ring or open frame of suitable wire or other material, formed of sufficient length wire, so that from the point of union of one end of the wire with the body to complete the ring, an extended end 2' is left to be bent downward, to form a standard or leg for entry in the ground, or the leg may be a separate member from the ring; on the opposite side, the ring body is so bent, as to form an eye or a recess 3, through which the opposite vertical standard 4 passes; for the purpose of holding the ring 2 in firm adjustment with the standard 4. I have a set screw 5 mounted in any convenient manner in the eye body 3 for clamping against standard 4, as shown in Fig. 1; thus the portion of standard 4 below the set screw 5, may form an opposite leg for ring 2 of equal length with the other. Thus ring 2, firmly supported by the standard 4 and leg 2', imbedded in the earth may be positioned close to the surface of the ground around the plant in the early stages of its growth or raised to a higher position as the plant grows; as a further part of my invention, and for the further support of the plant in its upward growth, and to enable a convenient sorting of the stems for cutting, and grouping of the same, I have the squares 6 and 7 formed of corrugated or crimped wire in rectangular formation; the wire forming the same, may be so bent on one side as to form in construction an eye 3 and with the set screw 5 mounted therein, engaging the standard 4; the standard 4 passing through the eye 3 may sustain the frames 6 and 7 at any given point along its length. It is apparent that when not in use the crimped squares 6 and 7 may be detached from the standard 4 and that the squares and standard may be packed or stored in a small compass or space, for future use or for shipping. Thus my device is readily adapted to different heights of plants and flowers, or vines. My device is not limited as to the number of square crimped frames, to be adjustably mounted along standard 4; when not in use as an entire support frame, the rectangular crimped frames 6 and 7 may be arranged, resting, one above the other on the ring 2 as shown in Fig. 2 or Fig. 3.

In a modified form of my invention I elect to have frame 8' mounted on sleeve 10 by means of the swivel pivot 9; the sleeve 10 slidably mounted on standard 4, and adjusted by means of the set screw 5 mounted in sleeve 10; in this manner the frame 8' may be adjusted at different angles on a horizontal axis, as well as on a vertical axis.

In operation, when the plants are young, I place the ring 2 near the bed surface so as to support and guide the plants in growing. When the plants are taller, I raise the ring or mount on the standard 4, the rectangular frame or frames 6 and 7 and 1 or frame 8' so as to support the longer stems; and for sorting, grouping and cutting, I group the stems in the recesses formed by the corrugations in the side of frames 6 and 7 and thus can more easily manipulate them for selection and cutting.

What I claim is:

In a plant support an open frame adapted to be disposed in a substantially horizontal plane and provided with a downwardly bent portion penetrating the ground, an eye on the frame, a standard passing through the eye and adapted to be supported in the ground, an additional frame provided with a sleeve to receive the standard, means for adjustably securing the sleeve on the standard and a swivel connection between the said additional frame and the sleeve to permit said additional frame to assume various angles with respect to the open horizontal frame.

FREDERICH E. KRUSE.